United States Patent [19]

Schmaling et al.

[11] Patent Number: 5,120,195
[45] Date of Patent: Jun. 9, 1992

[54] CLEVIS JOINT CAPABLE OF ACCOMMODATING SUBSTANTIAL PIVOTAL MOTION BETWEEN ITS JOINED MEMBERS AND LOADING ALONG ITS AXIS

[76] Inventors: David N. Schmaling, 55 Pinesbridge Rd., Oxford, Conn. 06483; Francis E. Byrnes, 3 Robinhood Rd., White Plains, N.Y. 10605

[21] Appl. No.: 602,456

[22] Filed: Oct. 23, 1990

[51] Int. Cl.⁵ .................. B64C 27/00; F16C 11/00
[52] U.S. Cl. .................. 416/134 A; 416/135; 416/131; 384/221; 384/222
[58] Field of Search ............... 416/134 R, 134 A, 131, 416/133, 135, 136; 384/221, 222

[56] References Cited

U.S. PATENT DOCUMENTS

| | | | |
|---|---|---|---|
| 2,580,514 | 1/1952 | Campbell | 416/102 |
| 2,819,105 | 1/1958 | Behnke | 287/85 |
| 3,222,082 | 12/1965 | Raidel | 280/104.5 |
| 3,652,185 | 3/1972 | Cresap et al. | 416/136 A |
| 3,804,552 | 4/1974 | Covington | 416/134 A |
| 4,232,563 | 11/1980 | Peterson et al. | 416/134 A |
| 4,349,184 | 9/1982 | Peterson | 416/134 A |
| 4,585,394 | 4/1986 | Schwarz et al. | 416/134 A |
| 4,859,148 | 8/1989 | Hibyan | 384/221 |
| 4,986,735 | 1/1991 | Robinson | 416/134 A |

Primary Examiner—Edward K. Look
Assistant Examiner—Michael S. Lee

[57] ABSTRACT

An improved clevis joint capable of withstanding substantial pivotal motion between its joined members and loading along its axis. An improved clevis joint wherein the parts joined thereby are pivotally connected by two sets of elastomeric bearings which are free to rotate about the joint axis and which envelope and support a free floating centering pin from the joined members so that during motion between the joined members, said elastomeric bearing sets share the rotary motion due to the rotating of the connecting pin.

6 Claims, 2 Drawing Sheets

CLEVIS JOINT CAPABLE OF ACCOMMODATING SUBSTANTIAL PIVOTAL MOTION BETWEEN ITS JOINED MEMBERS AND LOADING ALONG ITS AXIS

DESCRIPTION

1. Technical Field

This invention relates to an improved clevis joint and more particularly to such a clevis joint which can be used to pivotally connect the links of the scissors in a helicopter rotor and accommodate large pivotal excursions between the joined links. The joint also reacts loads imposed along the clevis joint axis by the action of the helicopter rotor dragging the swashplate with it in rotation during helicopter operation.

2. Background of the Invention

Clevis or reciprocating joints have been used in the mechanical arts for a number of years to join two parts which must rotate or pivot with respect to one another. While the parts of the clevis joint were originally wood or metallic, these parts were subject to wear and, therefore, bearings were eventually positioned between the moving parts of the clevis joints to facilitate the pivotal motion and prevent wear on the joint parts per se. Plain bearings of the early art were eventually replaced by rubber, or other types of elastomer bearings, but these bearings also presented wear problems and had to be replaced frequently because of the deteriorating effect which the various loads and stresses imposed thereon, including shear loads and tension loads, during the performance of their load carrying and pivot motion accommodating function.

Good examples of the prior art are shown in U.S. Pat. No. 2,819,105 to Behnke and U.S. Pat. No. 3,222,082 to Raidel.

The Behnke patent teaches a bushing in which a series of rubber bushings join two parts in an oscillating joint, and in which compressive loading is applied directly to the edges of the outboard bushings to in turn cause them to load the inboard bushings. This action produces a radial expansion of the rubber which causes the rubber to be pressed into grooves or recesses which are machined into a central sleeve. The resulting arrangement is extremely stiff against rotational motion and therefore torsional moments result in high tearing and shearing stresses in the rubber. Such an arrangement would be incapable of operating in an embodiment, such as the scissors of a helicopter rotor, requiring high rotational motion accommodation.

The Raidel patent also teaches an oscillating joint, but one in which four tapered bearings are shown in alignment, but in which only the two inner bearings accommodate rotational or pivotal motion between the joined parts. The two outer bearings are heavily preloaded by direct application of force to the edges thereof by a loading washer member to strengthen them to serve as load carrying members between the joined parts, and not rotating members. Accordingly, the degree of pivotal motion permitted by the Raidel construction is limited by the capacity for rotational motion of his two inner bearings. Raidel, therefore, also does not teach a construction which is capable of operating in an environment with high rotational demands between the joined parts, as is our construction.

In the clevis joint art, particularly demanding performance is required in the clevis joint used in the scissors of a helicopter rotor. This scissors rotates with the helicopter rotor and includes pivotal parts joined by a clevis joint which must pivot relative to one another as much as plus and minus 50° during low cycle scissor motion, and plus and minus 11° in high cycle scissor motion. The severity of this helicopter rotor environment is amplified by the fact that as the center of gravity of the scissors linkage moves radially in and out with respect to the rotor axis of rotation, coriolis forces are generated which quickly degrade the Teflon, (Registered trademark of E. I. DuPont) bearing located between the scissors links. The demands upon the clevis joint of a helicopter scissors include the ability to absorb the loads imposed upon the joint along its axis as the helicopter rotor "drags" the swashplate in rotation therewith about the rotor axis of rotation. This drag loading must be reacted by the bearings in the scissors clevis joint.

In the typical prior art scissors clevis joint, the parts joined by the joint were connected through two cylindrical Teflon bearings, while Teflon bushings reacted the axial drag load. The typical cylindrical Teflon bearing was incapable of reacting required loads except for short periods of time and, therefore, experience showed that 85 per cent of repairs in helicopter rotors was required in the bearings of the scissors clevis joint. Elastomer bearings were substituted for the Teflon bearings because of their high service life, however, there are limitations upon the degree of rotation or angular displacement which an elastomeric bearing can accommodate since each layer thereof is restricted in motion to approximately 5° of rotation or angular displacement.

Accordingly, while direct substitution of elastomeric bearings for the prior art Teflon bearings was considered, it was realized that the number of layers of elastomer needed to accommodate the required angular motion in a scissors clevis joint would be sufficiently high in number that the joint would be prohibitive in both weight and size. This direct substitution of an elastomeric bearing problem is compounded by the fact that successive layers of elastomer have to be made thicker because to obtain a uniform strain bearing, the ratio of the angular displacement to thickness must be equal. This is accomplished by decreasing the shear modulus and increasing the thickness of each successive laminate as discussed in Schmidt Pat. No. 3,679,197.

DISCLOSURE OF THE INVENTION

It is an object of this invention to teach an improved clevis or reciprocating joint of the type which may be used in the scissors of a helicopter rotor in which the two parts to be pivotally joined are joined through two sets of elastomeric bearings positioned in series, and each of which sets is fully free to rotate about the joint axis unrestrained and to further rotate with respect to the other set, and wherein a connecting bolt extends through the elastomeric bearings and is connected to the inner races thereof and rotates as the joined parts pivot with respect to one another so that the elastomeric bearing sets share the rotational motion imposed thereon by the pivot action of the joined parts, due to the rotation of the free floating connecting bolt.

It is a further object of this invention to teach such a clevis joint in which the elastomeric bearings are preloaded in compression only, and without restricting the rotational freedom of the elastomeric bearing, so as to react any load along the joint axis which the joint is anticipated to experience in operation without placing the elastomer in tension loading.

It is still a further object of this invention to teach such a clevis joint in which the elastomeric bearings are conical in shape and the compression preload is applied thereto by imposing the load on the elastomeric bearing inner races only, which races are operable to rotate with the connecting bolt, and in which the outer races of the elastomeric bearings are connected to the parts pivotally joined by the joint.

It is a further object of our invention to teach such a clevis joint which is light in weight, easy to manufacture, which requires no lubrication, which is contained within a small envelope, requires minimum maintenance, and which is capable of accommodating pivotal motion between the joined parts at least as high as plus and minus 50°.

It is an important feature of this invention that the elastomeric bearings in the clevis joint are free to rotate about the joint axis completely unrestrained.

Other objects, features and advantages of the invention will become apparent in light of the following description thereof.

BEST MODE FOR CARRYING OUT THE INVENTION

Figure 1:
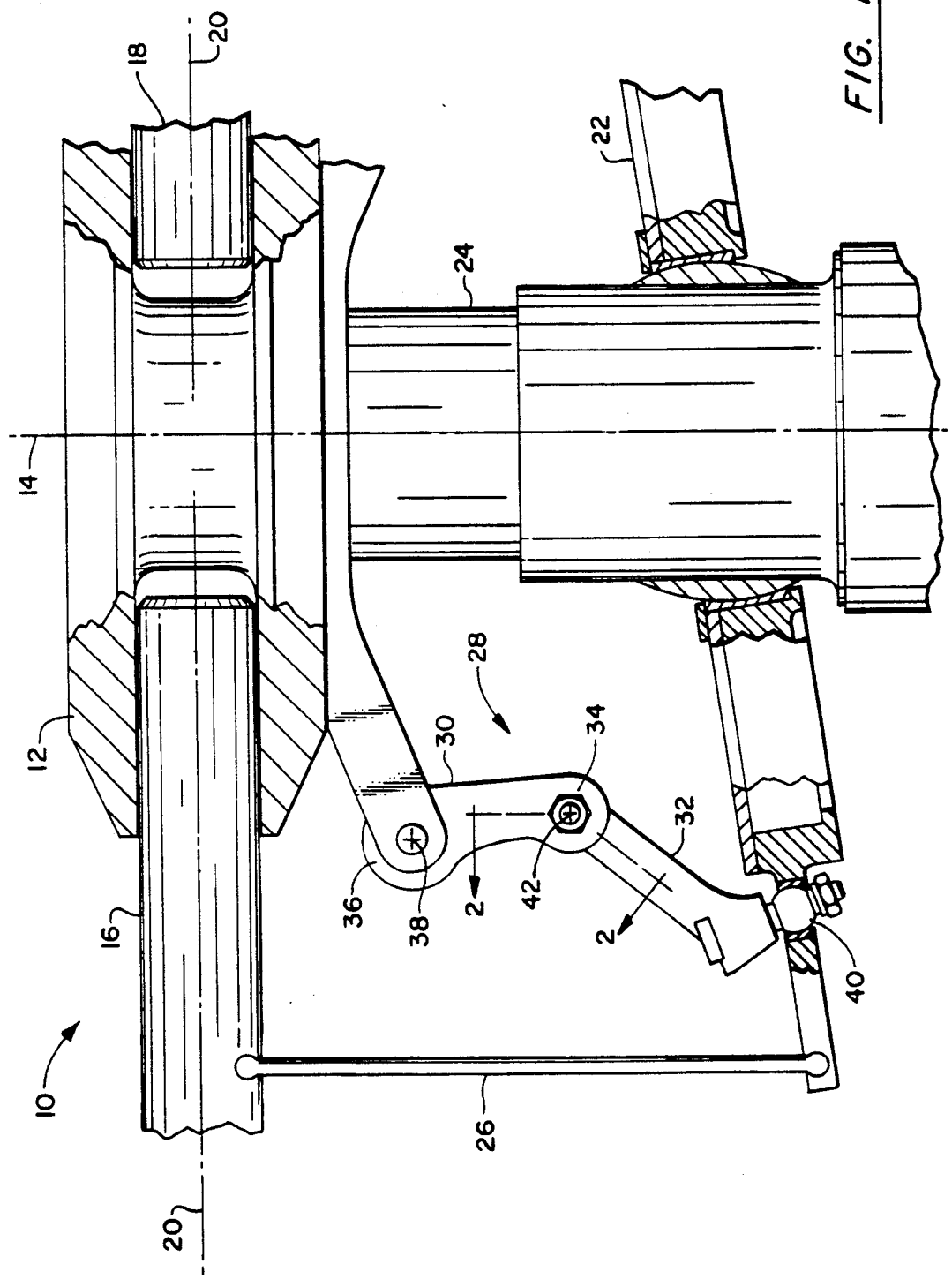
FIG. 1 is a side view of a typical helicopter rotor showing the scissors connecting the rotor head to the rotor swashplate.

FIG. 1 shows helicopter rotor 10, which includes rotor head 12 mounted for rotation about axis 14 and supporting at least two blades 16 and 18 for rotation therewith. Blades 16 and 18 are connected to the rotor head so as to be movable about pitch change axis 20.

Swashplate 22 is mounted on rotor drive shaft 24 and is operable in conventional fashion to both translate along axis 14 and tilt selectively with respect thereto. Swashplate 22 is connected to each blade, such as 16, through pitch change rod 26 so that, as swashplate 22 either moves axially along or tilts with respect to axis 14, pitch control rod 26 causes helicopter blades 16 and 18 to move to the desired pitch thereby controlling the flight of the helicopter. Scissors assembly 28 serves to cause swashplate 22 to rotate with rotor head 12. Scissors assembly 28 includes upper link 30 and lower link 32, which are joined by clevis or oscillating joint 34, which is the subject matter of our invention. Upper link 30 is pivotally connected at pivot joint 36 to be pivotable about axis 38, while link 32 is connected to swashplate 22 by spherical bearing 40.

In operation, as rotor head 12 rotates about axis of rotation 14, scissors assembly 28 serves the function of "dragging" swashplate 22 along to rotate about axis 14 with rotor head 12. In addition, scissors assembly 28, through the action of clevis joint 34, permits links 30 and 32 to pivot about axis 42 to accommodate both the translation and tilting of the swashplate 22 along and about axis 14.

Figure 2:
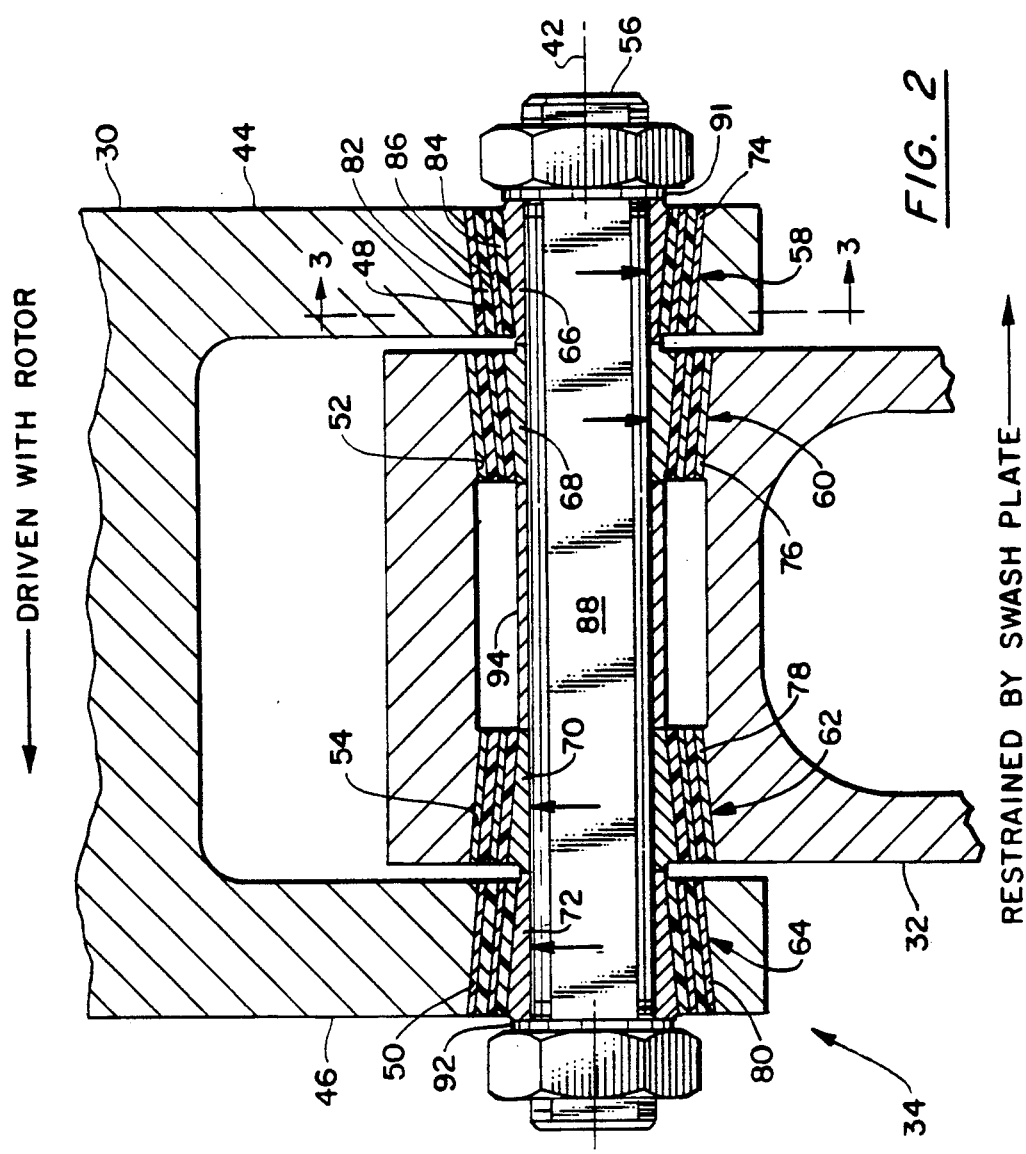
FIG. 2 is a sectional view taken along line 2-2 of FIG. 1.

Now viewing FIG. 2, we see in cross-section clevis joint 34, which is the subject matter of our invention. Clevis joint 34 joins upper link 30 and lower link 32 for relative pivotal motion about axis 42. Upper link 30 includes spaced flanges 44 and 46 with aligned apertures 48 and 50 extending therethrough. Lower link 32 is received between spaced flanges 44 and 46 of upper link 30 and includes aligned apertures 52 and 54 which, in operation, align with apertures 48 and 50 of upper link 30. Connecting bolt 56 extends through aligned apertures 48, 50, 52 and 54 and is supported in free floating relationship from links 30 and 32 by conical elastomeric bearings 58, 60, 62 and 64. Each of these elastomeric bearings includes an inner race 66-72 and an outer race 74-80. Alternate layers of elastomer, such as 82 and 84, and rigid material, such as 86, extend between the inner and outer races and are bonded thereto. Outer races 58-64 are bonded or otherwise joined to apertures 48 through 54. Bearings 58-64 are fabricated or assembled to be of equal torsional stiffness or spring rate.

Figure 3:
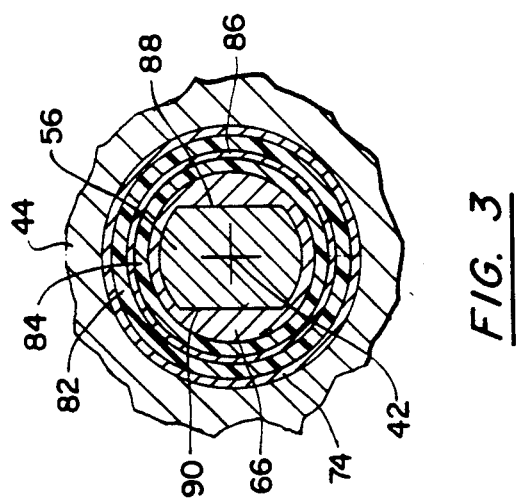
FIG. 3 is a sectional view taken along line 3-3 of FIG. 2.

As best shown in FIG. 3, inner races 66 through 72 are connected to rotate with connecting bolt 56 due to the mating of lands 88 in the inner races, such as 72, and 90 in connecting bolt 56. While we have chosen to utilize mating lands as the mechanism for causing all inner races to rotate with the rotating connecting bolt, it will be understood that other mechanisms could be substituted therefor, such as, a press fit (friction) between the inner races, key or spline attachments between the inner races.

It will be noted by viewing FIG. 2 that connecting bolt 56 is threaded so that, in typical nut and bolt fashion, connecting bolt 56 may serve to impose a compressive preload upon elastomeric bearings 58-64. It is a very important teaching of our invention that connecting bolt 56, through the action of flanges 91 and 92, impose a load upon the inner races 66-72 only of elastomeric bearings 58-64, so that the elastomeric bearings are mounted to be unrestrained for rotational motion about axis 42. The purpose of preloading the elastomeric bearings through their inner races only is to impose a compressive preload on the elastomeric bearings so that, as the clevis joint 34 reacts the drag load imposed thereon along axis 42 by scissors assembly 28 causing swashplate 22 to rotate with rotor head 12, the elastomeric layers, such as 82 and 84, are never loaded sufficiently that the compressive preload is overcome thereby putting the bearing in tension loading, which is a type of loading which the elastomer layers cannot tolerate. By absorbing this drag loading, the elastomer bearings serve to prevent joined members 30 and 32 from contacting one another, thereby greatly reducing the flexibility of joint 34. The drag load imposed upon the bearings 58-64 can best be appreciated by noting the arrows on FIG. 2 wherein viewing elastomeric bearing 58, the drag load imposes a tension load on the left-hand side of bearing 58 as shown in FIG. 2, and a compression load on the right-hand side of bearing 58 as shown in FIG. 2.

It will be appreciated that during assembly of joint 34, inner races 66 through 70 are spaced with respect to each other slightly and with respect to inner spacer 94 such that, as the precompressive load is applied on the inner races of the elastomeric bearings by the tightening of connecting bolt 56, these races and spacer will be brought into bearing contact with one another at a position in which the elastomeric bearings are preloaded in compression to the desired degree. This construction produces elastomer precompression without an increase in rotational stiffness of the elastomer, which would result if the preload force were applied directly to the elastomer free edge. Further, by applying the compressive preload through the bearing inner races only, and not by applying such a load to the elastomer edge, we preclude the occurrence of the high tearing and shearing stresses in the elastomer which would otherwise be encountered when the elastomer experienced rotational moments.

It will, therefore, be seen that, with our clevis joint 34 assembled as shown in FIG. 2, link members 30 and 32 are joined by a first set 58 and 60 and a second set 62 and 64 of elastomeric bearings which are joined in series and each connected to their respective links 30 and 32 through their outer races, and to connecting bolt 56 by their inner races. It will be evident that in our clevis joint 34, bearing sets 58 and 64 are free to move with link 30 about axis 42, with respect to bearing set 60 and 62 and link 32, and vice versa.

By viewing FIG. 2, it will be evident that the side-by-side relationship of the elastomeric bearings reduces the space envelope involved in diameter, and while the configuration appears to increase the longitudinal envelope, such length is typically required for reacting the edgewise or axial drag loads.

To fully appreciate the advantage to be gained by this construction, let us consider that link 32 is to pivot 20° clockwise about axis 42 with respect to link 30. As link 32 rotates clockwise about axis 42, a portion of that rotation is accommodated by the rotary motion of the elastomer layers in bearings 60 and 62. As bearings 60 and 62 carry connecting link 56 therewith through the first 10° of rotation and, as the rotational load is imparted by rotating connecting bolt 56 to bearings 58 and 64, the remaining 10° of rotation is accommodated by 10° of rotation of the elastomeric layers in bearings 58 and 64. Accordingly, it will be seen that, due to the rotation of connecting bolt 56 and the unrestrained rotatability of the bearings, the bearing sets 60–62 and 58–64 share the rotational motion caused by the pivoting of link 32 about link 30.

Similarly, loads to be transmitted from link 32 to link 30 will first be imposed upon bearing 60 and 62, then, through their inner races to connecting bolt 56, and then through inner races 66 and 72, then bearings 58 and 64 to link 30. Loads to be transmitted from link 30 to link 32 will follow the reverse of this load path.

It should be noted that apertures 48 through 54, bearings 58 through 64, and connecting bolt 56, are all circular or circular in cross-section and mounted to be concentric about axis 42.

While in our preferred embodiment, bearings 58 through 64 are conical, and therefore the utilization of connecting bolt 56 to preload the bearings in compression by preloading inner races 66 through 72 is an available feature, the elastomeric bearings could be made cylindrical and the compressive preload applied either during manufacture or at assembly. All such elastomeric bearings, whether conical or cylindrical are fabricated to be of equal torsional stiffness or spring rate.

We claim:

1. A clevis joint having an axis and comprising:
   a. a first member having two spaced end flanges with aligned apertures extending therethrough,
   b. a second member received between the flanges of said first member and having two aligned apertures in alignment with the apertures of the first member,
   c. a connecting bolt extending through said aligned apertures,
   d. elastomeric bearings of substantially equal rotational spring rate positioned in each of said apertures in alignment along said axis and so as to be free to rotate about said axis, and enveloping and supporting said connecting bolt to be free floating for rotation about said axis from said first and second members, and each bearing comprising:
      1) an outer race,
      2) an inner race, and
      3) alternate layers of elastomeric material and rigid material extending between said races,
   e. means connecting said outer races to their respective first and second members,
   f. means connecting each of said inner races to said connecting bolt so that said bearings coact to join said first member to said second member for pivotal motion with respect to one another about said axis through two sets of elastomeric bearings positioned in series therebetween, and wherein the pivotal motion between said first and second members is shared substantially equally between said sets of bearings due to the rotation of said free floating connecting bolt.

2. A clevis joint according to claim 1 wherein said elastomeric bearings are preloaded in compression.

3. A clevis joint according to claim 1 wherein said elastomeric bearings are conical and including:
   a. means to preload the inner races of said elastomeric bearings so as to impose a compressive preload on the elastic material therein of sufficient magnitude to be able to react any anticipated load imposed upon said clevis joint along said axis.

4. A helicopter rotor including:
   a. a rotor head mounted for rotation,
   b. at least two helicopter blades connected to and supported from said rotor for rotation therewith, and for pitch change motion with respect thereto,
   c. a swashplate member mounted to be movable toward and away from the rotor, and to be tilted with respect thereto,
   d. connecting means connecting said swashplate member to each of said blades to cause said blades to vary pitch as dictated by swashplate movement,
   e. a scissor member extending between said rotor head and said swashplate to cause said swashplate to rotate with said rotor and including:
      1) a top link pivotally connected to the rotor,
      2) and a bottom link pivotally connected by a spherical joint to the swashplate,
      3) a clevis joint connecting said top and bottom links of said scissor member for pivot motion about an axis and comprising:
   a) a first member forming one end of said top link and having two spaced end flanges with aligned apertures extending therethrough,
   b) a second member forming one end of said bottom link and received between the flanges of said first member and having two aligned apertures in alignment with the apertures of the first member,
   c) a connecting bolt extending through said aligned apertures,
   d) elastomeric bearings of substantially equal rotational stiffness positioned in each of said apertures in alignment along said clevis joint axis so as to be free to rotate about said axis, and enveloping and supporting said connecting bolt to be free floating for rotation about said axis from said first and second members, and each bearing comprising:
      1) an outer race,
      2) an inner race, and 3) alternate layers of elastomeric material and rigid material extending between said races, f. means connecting said outer races to their respective first and second members, g. means connecting each of said inner races to said connecting bolt so that said bearings coact to join said first member to said second member for pivotal motion with respect to one another about said axis through two sets of elastomeric bearings positioned in series therebetween, and wherein the pivotal motion between said first and second members is shared substantially equally between said sets of bearings due to the rotation of said free floating connecting bolt.

5. A clevis joint according to claim 4 wherein said elastomeric bearings are preloaded in compression.

6. A clevis joint according to claim 4 wherein said elastomeric bearings are conical and including:

a. means to preload the inner races of said elastomeric bearings so as to impose a compressive preload on the elastic material therein of sufficient magnitude to be able to react any anticipated load imposed upon said clevis joint along said axis.

* * * * *